Dec. 9, 1958 M. G. KROGER 2,863,940
COUPLING CIRCUIT
Filed Feb. 6, 1956
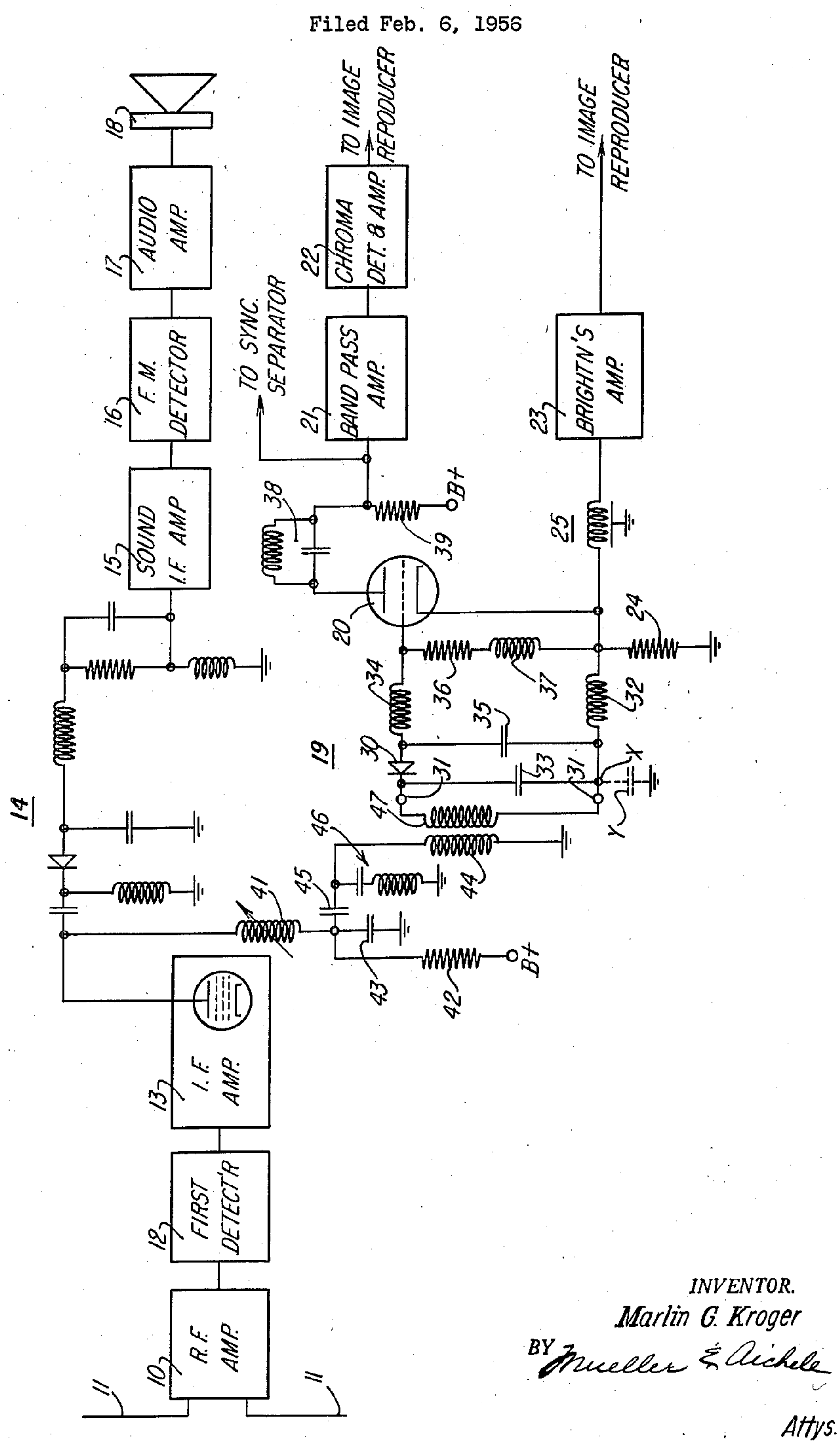
INVENTOR.
Marlin G. Kroger
BY Mueller & Aichele
Attys.

United States Patent Office 2,863,940

Patented Dec. 9, 1958

2,863,940
COUPLING CIRCUIT

Marlin G. Kroger, Elmhurst, Ill., assignor to Motorola, Inc., Chicago, Ill., a corporation of Illinois Application February 6, 1956, Serial No. 563,590

7 Claims. (Cl. 178—5.4)

The present invention relates to coupling circuits and more particularly to an improved coupling circuit which is particularly applicable to television receivers.

Difficulties have been encountered in present-day color television receivers designed to utilize the standard color television signals, in that there is a tendency for the sound signal of a received color television signal to beat with the chroma subcarrier component of that signal and produce beat frequency signals lying within the video frequency range so that they cannot be conveniently removed by trap circuits or the like. Because of this, many color television receivers use one detector to recover the brightness component and chroma subcarrier of a receiver color television signal, and a separate detector for recovering the intercarrier-sound signal. This permits a suitable trap circuit for the sound signal to be placed in the first-mentioned detector effectively to attenuate that signal and prevent the production of the beat frequency signals referred to above.

In order to facilitate the insertion of such trap circuits in the brightness and chroma detector described above, bottom coupled coupling circuits have been used between the intermediate frequency amplifier and this detector. This type of coupling circuit usually comprises a first inductance coil in the output of the intermediate frequency amplifier and a second inductance coil in the input of the detector; and these coils, instead of being inductively coupled, have their lower sides returned to a point of reference potential or ground through a common coupling impedance. When this bottom-coupled type of coupling circuit is used in the environment of a color television receiver for the reasons described above, the common coupling impedance used is usually a capacitor. A suitable series-resonant trap circuit tuned to the frequency of the sound signal may now be connected across the common coupling capacitor effectively to attenuate that signal. To be effective, this trap must have an extremely high overall quality factor (Q), and this can be achieved more readily with the bottom-coupled type of coupling circuit described above than with other types.

In copending application serial No. 372,547, filed in the name of Norman W. Parker on August 5, 1953, entitled Color Television Receiver and assigned to the same assignee as the present application, a "floating" detector is described for the brightness and chroma components of the received color television signal. This detector is connected between the control grid and cathode of a succeeding amplifier, and this connection permits the various components of the received color television signal to be derived from the amplifier with proper phase and polarity so that a minimum number of succeeding stages is required for the proper utilization of these components. However, when the bottom-coupled coupling circuit described is used in conjunction with such a detector circuit, the common coupling capacitor appears effectively across the input to the brightness channel coupled to the amplifier described above, and this seriously reduces the bandwidth of this channel so that a major portion of the brightness components are undesirably attenuated in this channel.

It is an object of the present invention to provide an improved coupling circuit of the bottom-coupled type which permits effective sound trapping and which may be used with a floating detector of the type described above without adversely affecting band-pass characteristic of the utilization channel coupled to such a detector.

A feature of the invention is the provision in a color television receiver of a bottom-coupled coupling circuit which includes an inductively coupled output winding so that the common coupling capacitor does not adversely affect the band-pass characteristic of the utilization channel fed by the circuit.

The above and other features of the invention which are believed to be new are set forth with particularity in the appended claims. The invention itself, however, together with further objects and advantages thereof, may best be understood by reference to the following description when taken in conjunction with the accompanying drawing in which the single figure is a schematic representation of a color television receiver with the portion thereof incorporating the present invention being shown in detailed circuitry.

The invention, as stated above, finds particular application in a color television receiver which includes an intermediate frequency amplifier having an output circuit, and which further includes a second detector having first and second input terminals. The system includes a network for coupling the intermediate frequency amplifier to the second detector, which network comprises a first inductance coil included in the output circuit of the intermediate frequency amplifier, and a second inductance coil having one side connected to a point of reference potential. One side of the first inductance coil is coupled to the other side of the second inductance coil through, for example, a blocking capacitor, and common coupling impedance means extend from this connection to the point of reference potential. A third inductance coil is inductively coupled to the second inductance coil and has a first and a second side respectively coupled to the first and second input terminals of the second detector.

The illustrated color television receiver is a superheterodyne type, and it includes a radio frequency amplifier 10 having input terminals connected to a suitable antenna 11 and having output terminals coupled through a first detector 12 to an intermediate frequency amplifier 13. The output circuit of the intermediate frequency amplifier is connected to a second detector 14 whose function is to recover the intercarrier-sound signal, and which feeds into the sound channel of the receiver which includes the usual sound intermediate frequency amplifier 15, a frequency modulation detector 16, an audio amplifier 17 and a sound reproducer 18.

Also coupled to the output of the intermediate frequency amplifier is a second detector 19 for the video frequency brightness components of the received color television signal and for the chroma components thereof. Detector 19 is coupled to the intermediate frequency amplifier through a bottom-coupled coupling network which is constructed in accordance with the invention and which will be described in detail. Second detector 19 is connected between the control grid and cathode of an electron discharge device 20 which functions as a video amplifier. The chroma channel of the receiver is coupled to the anode of device 20, and this channel includes a usual band-pass amplifier 21 for selecting and amplifying the chroma information. The chroma channel also includes usual chroma detectors and amplifiers (indicated by the block 22) which recover and amplify the various color-difference signals from the chroma subcarrier. The output of unit 22 is connected to the cathode-ray color image reproducer of the receiver (not shown) in known manner.

The cathode of device 20 is connected through delay line 25 to a brightness amplifier 23 which amplifies the video frequency brightness components and which constitutes the brightness channel of the receiver. The output of brightness amplifier 23 also is connected to the image reproducer in known manner.

The cathode of device 20 is connected to the point of reference potential or ground through a resistor 24.

The present-day color television signal is constituted by brightness components which in most respects is similar to the video frequency signal components of a monochrome television signal, and which components include the usual line and field synchronizing pulses. The color television signal also includes a chroma subcarrier that is amplitude and phase modulated in accordance with the chroma information of the receiver. As in the case of a monochrome television signal, a frequency modulated sound carrier is also included and is transmitted concomitantly with the picture carrier at a certain frequency displacement with respect thereto.

Such a color television signal may be intercepted by the antenna 11 and amplified in radio frequency amplifier 10. It is then heterodyned to the selected intermediate frequency of the receiver in first detector 12 and amplified in intermediate frequency amplifier 13. The intermediate frequency signal is fed to detector 14 in which the sound carrier is heterodyned with the picture carrier to derive an intercarrier-sound signal, this heterodyning technique being well known to the art.

The output of the intermediate frequency amplifier 13 is also coupled to a separate second detector 19 for the brightness and chroma components. As previously mentioned, this separate detector is used to permit suitable trapping expedients that prevent the production of beat frequency signals due to the heterodyning of the chroma subcarrier and the sound carrier. The detected brightness components are then fed to brightness amplifier 23 in the brightness channel of the receiver with the proper phase so that a minimum number of stages can be used to translate these components to the image reproducer. Likewise, the chroma subcarrier appears in amplified form at the anode for the efficient translation and detection thereof in the chroma channel 21, 22 with a minimum number of stages. In addition, the brightness components appear at the anode of device 20 with the synchronizing components extending in the positive-going direction which is the desired polarity so that they may be applied directly to a self-biasing synchronizing signal separator stage.

As previously stated, the present invention is concerned with an improved network for coupling the floating detector 19 to the output of the intermediate frequency amplifier, which coupling network will enable expedient trapping for the sound signal to be carried out and, at the same time, will not produce an undesired limiting effect on the bandpass characteristics of the brightness amplifier 23.

Second detector 19 includes a rectifier device 30 that may be a diode, a crystal, or any other suitable asymmetrical conductive device. The detector also includes a pair of input terminals 31, neither of which is grounded, one of the terminals being connected to one electrode of device 30 and the other being connected through an inductance coil 32 to the cathode of amplifier discharge device 20. The terminals 31 are shunted by a capacitor 33, and the other electrode of rectifier device 30 is connected through an inductance coil 34 to the control grid of device 20. This other electrode of device 30 is tied to the common junction of elements 32 and 33 through a bypassing capacitor 35. The control grid of device 20 is connected to the cathode through a resistor 36 and shunt peaking coil 37. The anode of device 20 is connected to the positive terminal B+ of a source of unidirectional potential through a parallel resonant trap 38 for the intercarrier sound signal and through a resistor 39. The common junction of resistor 39 and trap 38 is connected to the input of the bandpass amplifier 21.

The final stage of the intermediate frequency amplifier 13 includes an electron discharge device 40 whose anode is conected to the positive terminal B+ through the series combination of an inductance coil 41 and a resistor 42, the elements 41 and 42 being included in the output circuit of the intermediate frequency amplifier. The common junction of elements of 41 and 42 is connected to the point of reference potential or ground through a common coupling impedance in the form of a capacitor 43, and this common junction is also connected to one side of a second inductance coil 44 through a blocking capacitor 45, the other side of coil 44 being connected to ground. The common junction of blocking capacitor 45 and inductance coil 44 is connected to the point of reference potential or ground through a series resonant trap circuit 46, the trap being tuned to the frequency of the sound carrier. A third inductance coil 47 is inductively coupled to the coil 44 and has its respective sides connected to the input terminals 31 of the second detector 19.

The output intermediate frequency signal from amplifier 13 flows through the inductance coil 41 and the common coupling capacitor 43. The portion of the intermediate frequency output signal appearing across the coupling capacitor 43 also appears in the inductive winding or coil 44 and is inductively coupled to coil 47 to appear across terminals 31 for subsequent detection by the detector 19. The sound signal is trapped by resonant circuit 46 which constitutes a low impedance path to ground for this signal.

Any capacitance between the point X of the detector 19 and ground, such as shown by the dotted representation Y effectively appears across resistor 24, that is, across the input of the brightness channel. It is therefore, essential that this capacitance be maintained as low as possible so that the band-pass characteristic of the brightness channel will not be adversely affected with resultant loss of portions of the brightness components of the received color television signal. With the usual bottom-coupled coupling circuit, the common coupling capacitor 43 effectively adds to the value of the capacity Y and cuts down the pass band of the brightness channel. However, with the coupling circuit of the present invention, including the inductively coupled windings 44 and 47, common coupling capacitor 43 is effectively isolated and does not add to the capacity Y. The only capacity contributing to the capacity Y is the capacity between the windings 44, 47 which can be made sufficiently low that the pass band of the brightness channel is not affected thereby to any appreciable extent.

In a constructed embodiment of the invention the following constants were used, and these are listed herein merely by way of example and are not intended to limit the invention in any way.

| | |
|---|---|
| Device **20** | 6CB6. |
| Resistor **42** | 1 kilo-ohm. |
| Capacitor **43** | 150 micromicrofarads. |
| Capacitor **45** | 470 micromicrofarads. |
| Capacitor **33** | 1.5 microfarads. |
| Capacitor **35** | 6.8 microfarads. |
| Trap **46** | Tuned to 41.25 mc. |

The values of coils 41, 44, and 47 are chosen as to pass a frequency band of approximately 41.85 to 45.75 mc. to detector 19.

The invention provides, therefore, an improved coupling system that can be used in conjunction with a floating detector, which enables effective trapping of unwanted signals to be achieved and which does not adversely affect the pass band of any channel fed thereby.

I claim:

1. In a superheterodyne television receiver which includes an intermediate frequency amplifier having an output circuit, the combination including a second detector circuit having first and second input terminals both of which are floating with respect to ground, a network for coupling the intermediate frequency amplifier to said second detector circuit including, first inductive impedance means included in the output circuit of the intermediate frequency amplifier, second inductive impedance means having one side connected to a point of reference potential, means intercoupling said first inductive impedance means and the other side of said second inductive impedance means, said intercoupling means having a coupling portion extending to said point of reference potential, and third inductive impedance means inductively coupled to said second inductive impedance means and having a first and a second side respectively coupled to the first and second input terminals of said second detector circuit.

2. In a superheterodyne television receiver which includes an intermediate frequency amplifier having an output circuit, and a second detector having first and second input terminals; a network for coupling the intermediate frequency amplifier to the second detector including in combination, a first inductance coil included in the output circuit of the intermediate frequency amplifier, a second inductance coil having one side connected to a point of reference potential, means intercoupling one side of said first inductance coil and the other side of said second inductance coil, a coupling capacitor extending between said intercoupling means and said point of reference potential, and a third inductance coil inductively coupled to said second inductance coil and having a first and a second side respectively coupled to the first and second input terminals of the second detector.

3. The coupling network defined in claim 2 and which further includes a series-resonant trap circuit tuned to a selected frequency and connected across said coupling capacitor.

4. In a superheterodyne television receiver which includes an intermediate frequency amplifier having an output circuit, and a second detector having first and second input terminals; a network for coupling the intermediate frequency amplifier to the second detector including in combination, an inductane coil included in the output circuit of the intermediate frequency amplifier, a coupling capacitor connected to said inductance coil and to a point of reference potential, a first inductive winding having one side connected to said point of reference potential, a blocking capacitor coupled from the common junction of said inductance coil and said coupling capacitor to the other side of said first inductive winding, and a second inductive winding inductively coupled to said first inductive winding and having a first side and a second side respectively coupled to the first and second input terminals of the second detector.

5. A superheterodyne television receiver for utilizing a television signal which includes brightness and sound components, said receiver including in combination, an intermediate frequency amplifier having an output circuit with first inductance means included therein, a second detector circuit for the brightness components having first and second input terminals and first and second output terminals, an amplifier including an electron discharge valve having an anode, a cathode, and a control grid, first circuit means connecting said output terminals of said detector circuit to said control grid and said cathode, said first circuit means including direct current impedance means connecting said cathode to a point of reference potential, second inductance means having one side connected to said point of reference potential, second circuit means coupling said first inductance means to the other side of the said second inductance means, said second circuit means including a coupling portion connected to said point of reference potential and also including a trap circuit for the sound components, and third inductance means inductively coupled to said second inductance means and having first and second terminals coupled to said first and second input terminals of said second detector circuit.

6. A superheterodyne television receiver for utilizing a color television signal which includes brightness components, chroma components and sound components, said receiver including in combination, an intermediate frequency amplifier having an output circuit with first inductance means included therein, a sound channel coupled to said output circuit for utilizing the sound components of the received television signal, coupling impedance means connected to said first inductance means and to a point of reference potential, a series-resonant trap for the sound components connected in shunt with said coupling impedance means, second inductance means having one side connected to said point of reference potential, means for coupling the common junction of said first inductance means and said coupling impedance means to the other side of said second inductance means, third inductance means inductively coupled to said second inductance means, a detector for the chroma and brightness components of the received television signal having an input circuit including said third inductance means, an amplifier including an electron discharge device having an anode and a cathode and a control electrode, means for connecting said detector across said control electrode and cathode, resistor means connecting said cathode to a point of reference potential, a brightness channel coupled to said cathode for utilizing the brightness components of the received television signal, and a chroma channel coupled to said anode for utilizing the chroma and synchronizing components of the received signal.

7. A superheterodyne television receiver for utilizing a color television signal which includes brightness components, chroma components and sound components, said receiver including in combination, an intermediate frequency amplifier having an output circuit with an inductance coil included therein, a sound channel coupled to said output circuit for utilizing the sound components of the received color television signal, a coupling capacitor connected between said inductance coil and a point of reference potential, a series-resonant trap for the sound components connected in shunt with said coupling capacitor, a first inductive winding having one side connected to said point of reference potential, a blocking capacitor connected from the common junction of said inductance coil and said coupling capacitor to the other side of said first inductive winding, a second inductive winding inductively coupled to said first inductive winding, a detector for the chroma and brightness components of the received television signal having an input circuit, including said second inductive winding and having an output circuit, an amplifier including an electron discharge device having an anode and a cathode and a control electrode, the output circuit of said detector being connected across said control electrode and said cathode, resistor means connecting said cathode to a point of reference potential, a brightness channel coupled to said cathode for utilizing the brightness components of the received television signal, and a chroma channel coupled to said anode for utilizing the chroma and synchronizing components of the received signal.

References Cited in the file of this patent

UNITED STATES PATENTS 2,750,441 Schlesinger ------------ June 12, 1956

OTHER REFERENCES

Service Data, RCA Model CT–100, March 31, 1954, pages 31 and 32.